United States Patent [19]

Fredriksson et al.

[11] 4,429,003
[45] Jan. 31, 1984

[54] PROTECTIVE COATING FOR POROUS REFRACTORIES

[75] Inventors: John I. Fredriksson, Holden; John D. Morrow, Worcester; Giulio A. Rossi, Shrewsbury, all of Mass.

[73] Assignee: Norton Co., Worcester, Mass.

[21] Appl. No.: 308,697

[22] Filed: Oct. 5, 1981

[51] Int. Cl.³ .............................................. F23Q 7/10
[52] U.S. Cl. ........................... 428/317.9; 428/318.4; 428/318.6; 428/319.1; 428/331; 428/408; 428/446
[58] Field of Search ............... 428/446, 314.8, 318.6, 428/304.4, 317.9, 318.4, 319.1, 408, 331

[56] References Cited

U.S. PATENT DOCUMENTS

| | | | |
|---|---|---|---|
| 3,481,780 | 12/1969 | Mitoff | 117/215 |
| 3,492,153 | 1/1970 | Ervin, Jr. | 117/106 |
| 3,509,072 | 4/1970 | Barrington et al. | 252/516 |
| 3,875,476 | 4/1975 | Crandell et al. | 317/98 |
| 3,875,477 | 4/1975 | Fredriksson et al. | 317/98 |
| 4,120,829 | 10/1978 | Dulin | 252/516 |
| 4,187,344 | 2/1980 | Fredriksson | 428/304 |

*Primary Examiner*—Marion McCamish
*Attorney, Agent, or Firm*—Arthur A. Loiselle, Jr.

[57] ABSTRACT

A porous refractory object, more particularly a porous silicon carbide igniter is shown, the interconnecting pores and passageways of its body being filled with sub-micron sized silicon carbide particles deposited therein from a slurry coated on the surface of the object, which particles are subsequently oxidized at least on the surface and within the passages or pores in the subjacent surface portion of the body, to provide a protective coating of silica within the pores and on the surfaces of the object to preclude oxidation of the internal phases of the body of the object in oxidizing atmospheres.

10 Claims, 5 Drawing Figures

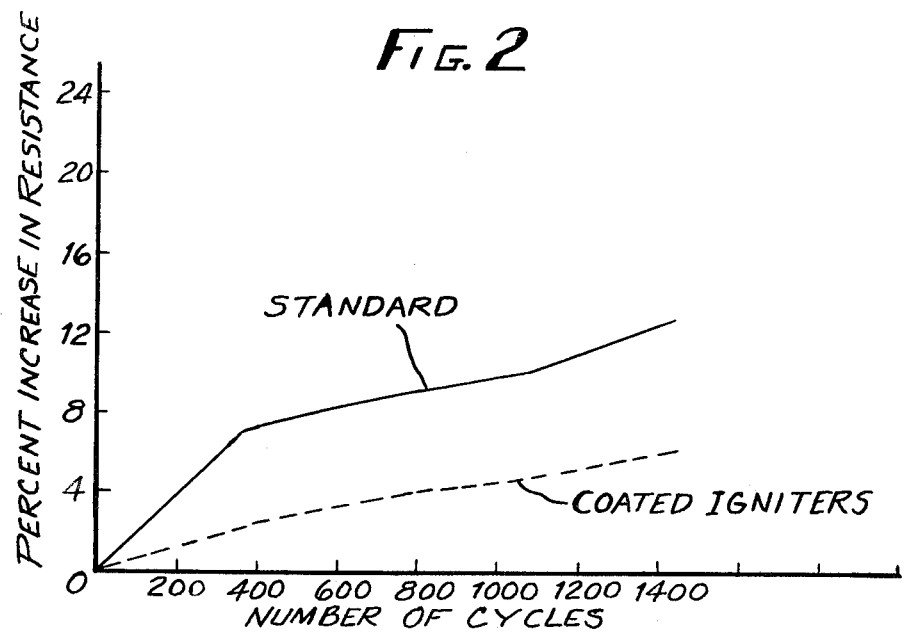
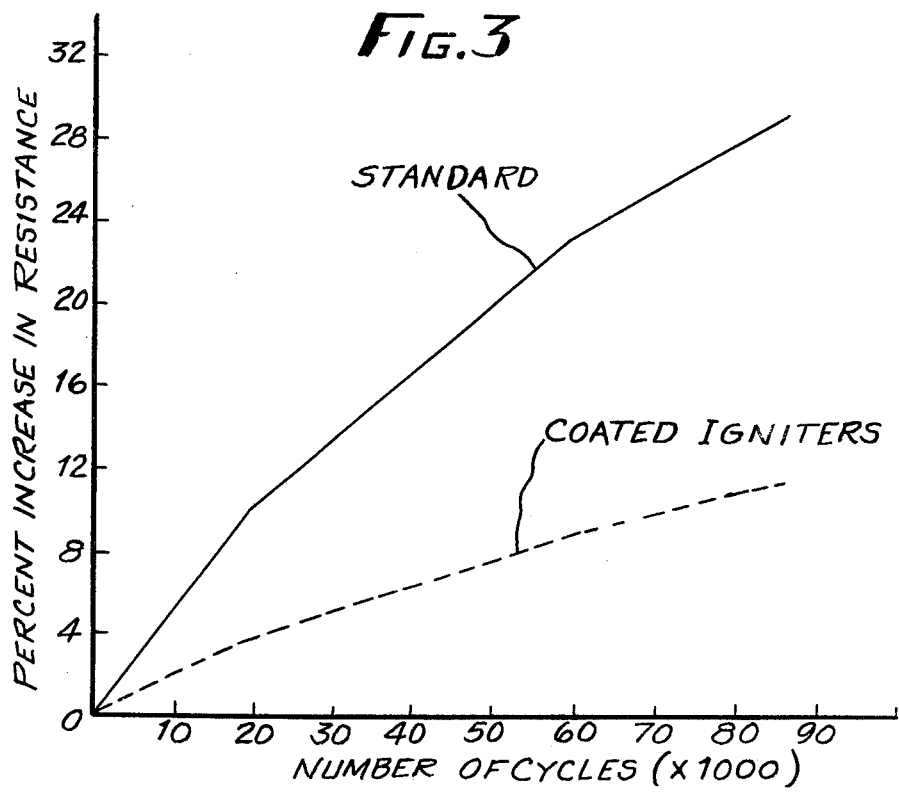

PROTECTIVE COATING FOR POROUS REFRACTORIES

TECHNICAL FIELD

The invention relates to porous refractory products and oxidatively protective coatings therefor.

BACKGROUND ART

The following publications are representative of the most relevant prior art known to the Applicants at the time of filing the application.

| U.S. PAT. NOS. | | |
|---|---|---|
| 3,481,780 | December 2, 1969 | S. P. Mitoff |
| 3,492,153 | January 27, 1970 | G. Ervin, Jr. |
| 3,509,072 | April 28, 1970 | J. Barrington et al |
| 3,875,476 | April 1, 1975 | W. B. Crandell et al |
| 3,875,477 | April 1, 1975 | J. I. Fredriksson et al |
| 4,120,829 | October 12, 1978 | F. H. Dulin |
| 4,187,344 | February 5, 1980 | J. I. Fredriksson |

Porous refractory bricks, kiln furniture, resistor bars and the like formed of sintered refractory grains are subjected to oxidizing atmospheres in their normal usage and are known to oxidize producing stresses which cause them to crack, warp or become brittle such that their utility is decreased or destroyed. It is also known that sintered and bonded e.g. silicon nitride bonded silicon carbide electrical elements such as heating elements and igniters are particularly susceptible to oxidative deterioration, the severity of which depends upon the usage to which the particular element is put.

Sintered silicon carbide igniter elements positioned near a gas nozzle have contact with the gas flame and are greatly affected by this corrosive environment. The igniter oxidation problem is particularly acute in the ovens of kitchen gas stoves where the manufacturer's specifications are very restrictive. When installed in the oven of a gas stove, the igniter is energized with an electric current. After a prescribed amperage flow is reached the gas flow controls are activated to open the gas valve permitting a flow of gas that is ignited to heat the oven. The igniter remains energized as long as the oven is in use even though the gas flame is turned off and on again in response to the thermostat controlling the oven's temperature. The oven igniter which sits above or beside the gas burner, is bathed in the intermittently ignited gas flame until the cooking cycle has been completed. Such placement of the igniter, coupled with the strict limitation on amperage variation permitted within the usual specifications written for this usage, represents a severe environment which causes oxidative deterioration of the silicon carbide. Therefore it is desirable to protect the silicon carbide from oxidation.

An igniter to which this invention may be applied is shown in the U.S. Pat. No. 3,875,477 to Fredriksson and Coes, Apr. 1, 1975. The structure there described is a sintered silicon carbide body that has found widespread use in gas and liquid fuel burning systems such as clothes dryers, furnaces, etc., but has suffered a somewhat shortened life expectancy when used in the more severe conditions present in ovens of gas stoves as discussed above.

One proposal for minimizing the destructive effects of oxidation on refractory bodies is described in U.S. Pat. No. 4,187,344 to Fredriksson, Feb. 5, 1980. Silicon nitride and/or silicon oxynitride particles, suspended in a liquid slurry are carried into the pores of the refractory article to provide a protective surface coating. The particles are carried into the body of the refractory, beyond the entrance to the exposed surface pores and after the slurry has dried and the article is fired at 1000° C. to fix the silicon oxynitride or silicon nitride particles in place. The protective layer or coating made with these nitride particles is more or less permanently embedded in place to provide a degree of protection in the form of a barrier against undue oxidation of the igniter in certain hostile environments. However, it has been found in practice, that when these igniters are operated in the gas flame within the oven of a stove, that the water vapor present along with the other products of combustion of the gas detrimentally react with the submicron sized silicon nitride or silicon oxynitride impregnant particles. An igniter filled with either of these nitrides, while showing some improvement in retardation of oxidative aging in this environment, was not as long lived as was needed for complete satisfaction in the gas oven field.

In other approaches to a similar problem refractory silicon carbide bodies used for rocket nozzles and high temperature heating elements have been densified as described in U.S. Pat. No. 3,492,153 to Ervin Jan. 27, 1970 by forming aluminum nitride in situ within the pores of the body by reacting aluminum vapor with nitrogen gas within the pores of the silicon carbide article. The aluminum nitride thus formed deposits from the vapor state onto the walls of the pores of the body. The patent also suggests that ammonia and aluminum trichloride or aluminum iodide and nitrogen can be reacted to produce an aluminum nitride vapor that will under the conditions described in the patent, deposit as a solid within the pores of such a silicon carbide article. This structure does not have an acceptable life in a gas oven environment because of the reactivity between the water vapor in the gas flame and the aluminum nitride impregnant.

The Mitoff reference discloses the densification of coatings of zirconia and thoria by painting these coatings with a concentrated aqueous solution of iron chloride, usually several applications of the solution are required, heating the painted body to a temperature in excess 1300° C. in a gaseous reducing atmosphere having a controlled oxygen partial pressure such that essentially only ferrous oxide is produced in the pores of the zirconia and thoria coatings.

Attempts to make igniters more resistant to oxidative deterioration are shown in U.S. Pat. No. 3,509,072 to Barrington et al. Apr. 28, 1970; U.S. Pat. No. 3,875,476 to Crandall et al. Apr. 1, 1975; U.S. Pat. No. 4,120,829 to Dulin Oct. 17, 1978 and U.S. Pat. No. 4,204,863 to Schreiner May 27, 1980. All of these disclosures describe the use of various bonding compositions from which an igniter may be constructed in a manner to improve its serviceability. However, in following each of these inventions described in the respective patents the electrical characteristics of the resulting igniter are materially altered.

DISCLOSURE OF THE INVENTION

Porous refractory shapes, kiln furniture, resistance heaters, and especially electrically energized igniters can be more assuredly protected against oxidative deterioration by filling the pores of the article with a slurry of fine sized silicon carbide particles suspended in a liquid that is then evaporated. The treated article either before service or in service is subjected to heat in an oxidizing atmosphere to convert at least the outermost layer of silicon carbide particles on the surface of and also those particles residing at least within the entrance passages in the pores. Since the $SiO_2$ molecules occupy more space than the SiC molecules that were oxidized, the oxidation reaction in situ, forces the $SiO_2$ to expand against the walls of the pores to block them and reduce diffusion of $O_2$ to the interior of the product. In the deeper pores, interconnected with the surface pores, some of the silicon carbide particles may remain unoxidized and if any of the surface layer of oxidized coating should flake or spall off, the fine silicon carbide particles that had penetrated more deeply into the pores within the body are then oxidized to renew the sealing layer to provide a self healing coating for such articles.

Silicon carbide electrical heater elements are known to be particularly susceptible to oxidative deterioration which substantially changes the electrical properties of these elements. The coating applied to such resistance heaters by reacting fine silicon carbide particles with oxygen within the pores has been found to be particularly effective in these devices. The oxidized particles being formed in situ serve to protect the heater element against oxidative aging and may be applied to these electrical resistor structures without significantly affecting the electrical characteristics of the silicon carbide element.

In a preferred form of this invention, submicron sized silicon carbide powder is caused to impregnate an igniter element like that shown in the Fredriksson and Coes U.S. Pat. No. 3,875,477 that is essentially a low density porous sintered silicon carbide resistor element. That reference is hereby incorporated by reference in its entirety including the drawing which will be referred to in detail below. The sintered silicon carbide igniter body has an internal network of open and interconnecting pores which are larger than the particles of fine silicon carbide. The electrical characteristics of the igniter are established by the current flow path through the continuous silicon carbide crystals of the igniter body. When an unprotected igniter is energized the body of the igniter heats up and, since the oxidizing atmosphere in which the igniter is used can penetrate into the pores, the silicon carbide crystals at the surface of the igniter body pores react with the oxygen so that the interconnecting grain paths become narrowed and the electrical characteristics of the igniter change. The speed of this oxidation or aging process seems to be promoted by the passage of an electrical current through the body especially when that body is bathed in the gas flame within the oven of a stove where the igniter remains continuously energized in the presence of moisture and the other products of combustion from the gas flame.

In order to block these corrosive products of combustion from entering the pores, sub-micron sized silicon carbide particles are mixed in a water slurry that is used to coat the surface of the igniter body and impregnate the pores of the igniter. After the water has been evaporated, the SiC particles in the pores are at least partially oxidized in situ at high temperature to fill the entrances to the pores. This heat treatment can take place as a step in the manufacture of the device or it can occur when the igniter is used for the first time in a gas oven. The exposed silicon carbide particles on the surface of the igniter are oxidized to $SiO_2$ to seal over the exposed surface of the body and at least the particles at the entrances to the pores and the interconnected pathways to the pores are also oxidized to block the internal pore network.

It should be noted that when the silicon carbide particles oxidize, the silica produced occupies more space than the original silicon carbide thus tending to fill the pores. This sealing action begins at the surface so that the more deeply embedded silicon carbide particles deposited below the surface layer of the igniter body may not be oxidized.

BRIEF DESCRIPTION OF THE DRAWING

FIG. 1, showing the coating and sealing of the silicon carbide igniter structure.

FIGS. 2-5 are curves representing the compilation of data showing operating comparisons of igniters embodying this invention with unprotected igniter devices, under various operating conditions.

EXAMPLE OF THE PREFERRED EMBODIMENTS

Figure 1:
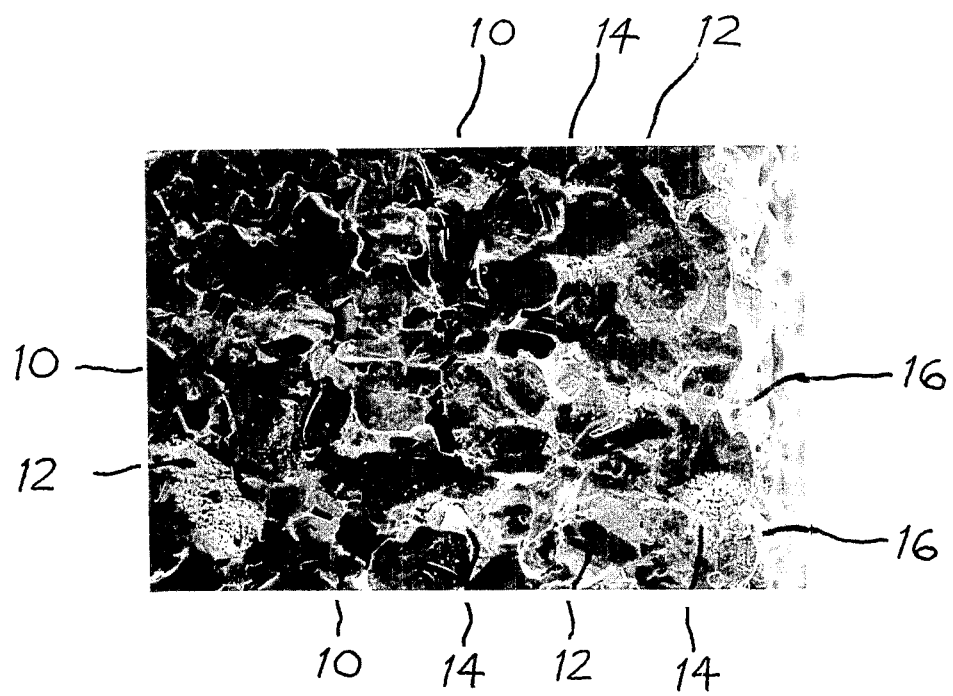
FIG. 1 is a 100x photomicrograph of a section of the igniter of FIG. 1 of Fredriksson et al. taken through the leg 8 of Fredriksson et al's.

FIG. 1 of this application shows the microstructure of an igniter like FIG. 1 of the Fredrikson et al reference which has a plurality of open and interconnecting pores 10. The pores are uniformly distributed within the body that is formed of silicon carbide grains 12 that are self bonded to form a unitary structure. The surface porosity is filled with silica 16 while the inner porosity contains unreacted fine silicon carbide 14. The method of fabricating such an igniter is fully set forth in the Fredriksson et al. patent mentioned above.

The sintered silicon carbide body is porous and to provide the desired protection, the body is first coated with a slurry of water and fine silicon carbide powder having a particle size much smaller than the size of the pores and interconnecting pore passages 10, said particles being of an average size of 0.25 micron with particles as large as 2 microns. Preferably the silicon carbide powder for the slurry is provided in sizes that are 0.1 of the diameter of the pores or smaller. The powder is mixed with water that is preferably distilled or deionized. The slurry is made by mixing 500 g of silicon carbide powder with 500 ml of water. For a reason set forth below, an alkali or ammonium silicate, or preferably 3.5 m of a sodium silicate solution having a concentration of 37.6% by weight of the silicate is added to the slurry.

The igniter may be coated by being sprayed with the silicon carbide particle slurry, or the igniter may be dipped, painted or subjected to a vacuum impregnation step. In all cases the slurry will flow by capillary action into the open and interconnected pores to carry the silicon carbide particles well into and in some cases substantially through the entire internal phase of the body.

After the slurry has been impregnated into the pores, the article is laid on a wire screen to dry in the air and thereafter it is placed in an oven at a temperature of 100° to 150° for a period of two hours or more to thoroughly remove all of the moisture from the slurry in the pores and interconnecting passages. The silicon carbide particles are thus deposited in the pores and provide a slightly porous matrix within the internal passages of the body of the igniter.

The impregnated igniters are then placed on suitable kiln furniture such as an alumina plate to be fired in an oxidizing atmosphere at a temperature of about 800° C. to as high as 1600° C. for about one hour. The submicron sized silicon carbide particles are quite reactive and the particles on the surface of the igniter and within the entrances to and to some extent the particles within the open and interconnected pores and passageways react to form a silica coating 16 on the surface of the igniter. Since the formed silica occupies a volume larger than silicon carbide, the surface pores and passageways become blocked against the flow of the oxidizing gases into the internal phases of the body structure. The oxygen that initially passes into these pores is utilized in reacting with the fine silicon carbide particles beginning at the surface of the igniter body so that silicon carbide particles which impregnate within the internal spaces of the igniter body may remain unaffected by the oxidizing procedure. It should be noted that the fine particles of silicon carbide carried into the pores in the slurry are so much more reactive than the sintered silicon carbide crystals of which the igniter is made, that the silicon carbide crystals 12 of the igniter body remain substantially unoxidized during this oxidizing step.

The slurry preferably includes a deflocculant such as an alkali silicate, or an organic deflocculant to aid deflocculation of the particles in the slurry. Sodium silicate is preferred. Lithium silicate may be found to be too corrosive in some applications and ammonium and less reactive silicates as compared with sodium do not speed up the oxidation reaction to the desired rate. The small addition of sodium silicate provides the desired effect without introducing an unduly corrosive element into the igniter structure.

After the oxidizing procedure for converting the silicon carbide particles to silica in situ has been completed, the article is allowed to cool down and the usual final manufacturing steps are completed, then the igniter is ready for use.

Compared with a standard unprotected igniter, substantial increases in resistance to aging are realized.

Referring to FIG. 2, a coated igniter of this invention was compared with a standard unprotected igniter such as described in the Fredriksson et al. patent, where the igniters were run for 15 minutes over an ignited natural gas flame and then cooled by a fan for 15 minutes. Resistance measurements showed that the coated igniter had only 50% of the resistance change of the uncoated igniter after 1400 cycles.

In FIG. 3 the igniters were energized for 30 seconds in an ignited natural gas flame and then the igniters and gas were turned off for 30 seconds. Over a range of 85,000 cycles the data show a much slower build up of resistance and therefore a longer life expectancy for the coated igniter as compared with an unprotected igniter.

Figure 4:
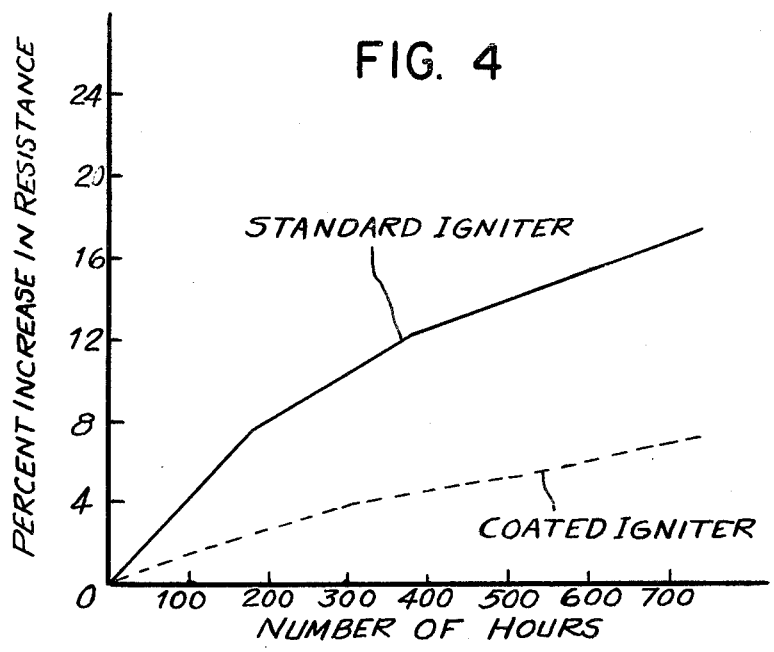

In FIG. 4 in a continuous atmosphere of burning natural gas in a large refractory chamber, a continuously energized unprotected standard igniter was found to age much more rapidly 700 hours, compared with an igniter of this invention.

Figure 5:
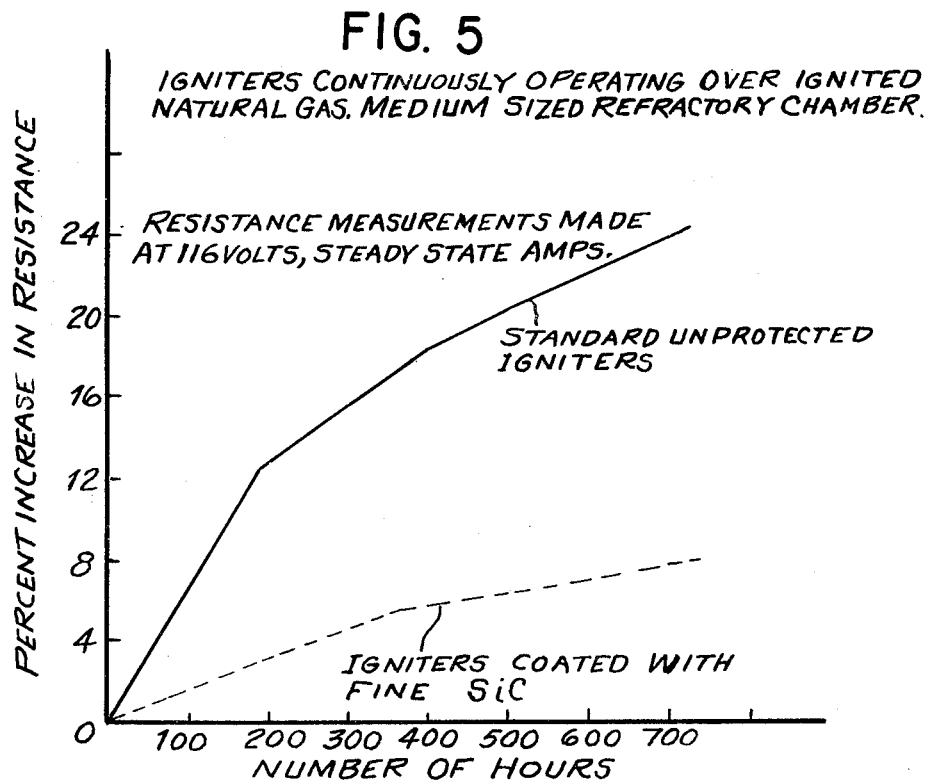

The data recorded in FIG. 5 show that in a continuous flame within a more confined environment such as a medium sized refractory chamber, the unprotected igniter ages at a steadily more rapid rate than the standard igniter tested in the large refractory chamber as per the data in FIG. 4 and yet the coated igniter in the smaller chamber aged at about the same rate as the coated igniter did in the larger refractory chamber.

Comparing all of these data and assuming that the unprotected standard igniters had an aging rate of 100%, the aging rates of the coated igniters were as follows:

| Test   | Length of Test | Aging Rate |
| ------ | -------------- | ---------- |
| FIG. 2 | 1440 Cycles    | 49.1%      |
| FIG. 3 | 86410 Cycles   | 40.3%      |
| FIG. 4 | 722 Hours      | 41.4%      |
| FIG. 5 | 722 Hours      | 33.5%      |

It should be noted that if at any time during the operation of an igniter made as here disclosed, the surface silica coating should be chipped away, the unreacted sub-micron sized silicon carbide particles remaining within the internal pores and connecting passages would quickly oxidize in the presence of the added sodium silicate, so that the desired silica seal would be quickly reestablished. This structure is thus self healing.

While the preferred example of this invention has been described above, various porous refractory objects such as refractory carbide, boride and silicide kiln furniture, bricks, plates and other such objects can likewise be improved. Under certain firing procedures such refractory objects will oxidize unevenly causing them to warp and crack. They sometimes become embrittled as they oxidize. The porous bodies of such refractory items can be filled with the fine silicon carbide particles in a slurry as here described and then the slurry dried to deposit the particles in the pores. Upon oxidation, the silica sealant layer on the surface and in the pores of the objects can be produced to protect the internal structure of this refractory object from oxidative aging or deterioration as compared with corresponding unsealed porous refractory object.

What is claimed is:

1. A porous refractory article including a coating of the silicon carbide particles having an average particle size of 2 micron or finer, and wherein said fine silicon carbide particles have penetrated into at least the surface pores of said refractory article.

2. The porous refractory article of claim 1 wherein at least the fine silicon carbide in the surface pores of said refractory article have been oxidized to silicon dioxide thereby forming a barrier to the passage of oxidizing gases into the body of the refractory article.

3. A porous refractory body as in claim 2 wherein the body is a sintered silicon carbide element.

4. A porous refractory body as in claim 3 wherein the sintered silicon carbide element is an electrical resistance heater.

5. A porous refractory body as in claim 4 wherein the element is an igniter.

6. A porous refractory body as in claim 2 wherein the body is a sintered element and the silicon carbide has an average particle size with a maximum particle size of 2 microns.

7. The porous refractory article of claim 1 in which the coating contains an organic or inorganic deflocculating agent in the amount of 0.05 to 1% by weight of the weight of said fine silicon carbide powder.

8. A porous refractory body as in any one of claims 2, 3, 4, 5, 6, or 7, wherein 0.05 to 1% by weight of a silicate selected from the group consisting of lithium silicate, sodium silicate, potassium silicate, and ammonium silicate is present in said fine silicon carbide.

9. A porous refractory body as in any one of claims 2, 3, 4, 5, 6, or 7, wherein a small amount of sodium silicate is present in said fine silicon carbide.

10. A sintered silicon carbide resistance igniter, said igniter having a body with open and interconnected pores having entrances to said pores exposed on the surface thereof including a silicon oxide layer that covers the surface of the body and extends at least into the entrances to said pores which silicon oxide was produced in situ upon the selective oxidation of fine particles of silicon carbide positioned on the surface of the igniter and impregnated deeply into the pores in the igniter body, which silicon carbide particles having been deposited on the surface and within the pores while in a liquid suspension, and said silica layer blocking the pores within said body against oxidation of a portion of said sintered silicon carbide whereby to produce a self healing igniter should any of the surface coating be displaced.

* * * * *

UNITED STATES PATENT AND TRADEMARK OFFICE
CERTIFICATE OF CORRECTION

PATENT NO. : 4,429,003

DATED : Jan. 31, 1984

INVENTOR(S) : John I. Fredriksson; John D. Morrow; Giulio A. Rossi

It is certified that error appears in the above-identified patent and that said Letters Patent is hereby corrected as shown below:

In the Claims:

Col. 6, line 39:  Claim 1  "the silicon carbide" should read "fine silicon carbide"

Signed and Sealed this

Ninth Day of April 1985

[SEAL]

Attest:

DONALD J. QUIGG

Attesting Officer  Acting Commissioner of Patents and Trademarks